(12) United States Patent
Kato et al.

(10) Patent No.: US 12,418,226 B2
(45) Date of Patent: Sep. 16, 2025

(54) MAGNETIZING APPARATUS AND MAGNETIZING METHOD

(71) Applicant: HONDA MOTOR CO., LTD., Tokyo (JP)

(72) Inventors: Toshitaka Kato, Wako (JP); Shinji Nemoto, Wako (JP); Tokio Taira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 18/123,355

(22) Filed: Mar. 20, 2023

(65) Prior Publication Data
US 2023/0318413 A1 Oct. 5, 2023

(30) Foreign Application Priority Data
Mar. 29, 2022 (JP) ................. 2022-053131

(51) Int. Cl.
H02K 15/03 (2025.01)
(52) U.S. Cl.
CPC ........ *H02K 15/03* (2013.01); *Y10T 29/49012* (2015.01)

(58) Field of Classification Search
CPC ........ H02K 15/03; H02K 1/278; H02K 1/276; Y10T 29/49012; Y10T 29/49009
USPC .............................. 29/598.596, 606
See application file for complete search history.

(56) References Cited

U.S. PATENT DOCUMENTS 7,779,532 B2 * 8/2010 Sakamoto ............. H02K 15/03
  29/598
9,082,546 B2 * 7/2015 Komura ................ H01F 13/003

FOREIGN PATENT DOCUMENTS

JP    2005-224055    8/2005

* cited by examiner

*Primary Examiner* — Thiem D Phan
(74) *Attorney, Agent, or Firm* — Amin, Turocy & Watson, LLP

(57) ABSTRACT

A magnetizing apparatus includes a holding member including a rotor fixing portion for holding a rotor, a coil member including a support plate that is thin plate-shaped and a coil that is incorporated inside the support plate, and a coil fixing portion that is provided to the holding member and arranges and fixes a plurality of coil members radially with respect to the center of the rotor fixing portion.

13 Claims, 4 Drawing Sheets

MAGNETIZING APPARATUS AND MAGNETIZING METHOD

CROSS-REFERENCE TO RELATED APPLICATIONS

This application is based upon and claims the benefit of priority from Japanese Patent Application No. 2022-053131 filed on Mar. 29, 2022, the contents of which are incorporated herein by reference.

BACKGROUND OF THE INVENTION

Field of the Invention

The present invention relates to a magnetizing apparatus and a magnetizing method for a rotor used in a motor.

Description of the Related Art

Electric vehicles, which do not emit greenhouse gases and have excellent environmental performance, are attracting attention. An electric vehicle is equipped with a high-output motor as a drive source. Electrification is also being promoted for aircraft and various work equipment, and in the field of general-purpose equipment, replacement of engines with motors is also being promoted.

Among the motors, the PM motor having permanent magnets in its rotor is said to be superior in efficiency and environmental performance. The rotor used for such a motor has a magnetizing step for magnetizing a magnetic body at the final stage of the manufacturing process. For example, JP 2005-224055 A discloses a magnetizing apparatus and a magnetizing method for multipole magnetic bodies arranged in a rotor.

SUMMARY OF THE INVENTION

As the number of places where motors are used increases, the diameter and number of poles of the rotor have diversified. In the case of the conventional magnetizing apparatus, since a magnetizing apparatus is required for each type of rotor, there is a problem that waste and inefficiency in equipment increases as the types of rotors increase.

An object of the present invention is to solve the above-described problems.

Disclosed is a magnetizing apparatus that includes a holding member that holds a rotor including a magnetic body, a coil member that includes a support plate that is thin plate-shaped and a coil that is incorporated inside the support plate and wound along the plane of the support plate, and a coil fixing portion that is configured to arrange and fix the coil member around the outer peripheral portion of the rotor in a manner so that the direction of electric current at a portion of the coil closest to the magnetic body coincides with the axial direction of the rotor, wherein the coil member generates a concentric magnetic field around the coil according to the right-hand rule and magnetizes the magnetic body with the concentric magnetic field.

Another aspect is a magnetizing method that includes a coil arranging step of arranging, around the outer peripheral portion of a rotor including a magnetic body, a coil member including a support plate that is thin plate-shaped and a coil that is incorporated inside the support plate and wound along the plane of the support plate, and a magnetizing step of magnetizing the magnetic body by supplying electric current to the coil member, wherein the coil arranging step includes arranging and fixing the coil member in a manner so that the direction of electric current at a portion of the coil closest to the magnetic body coincides with the axial direction of the rotor, and the magnetizing step includes generating a concentric magnetic field around the coil according to the right-hand rule and magnetizing the magnetic body with the concentric magnetic field.

The magnetizing apparatus and the magnetizing method according to the above-described aspects can flexibly cope with rotors having various diameters and numbers of poles, and therefore waste and inefficiency in equipment can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
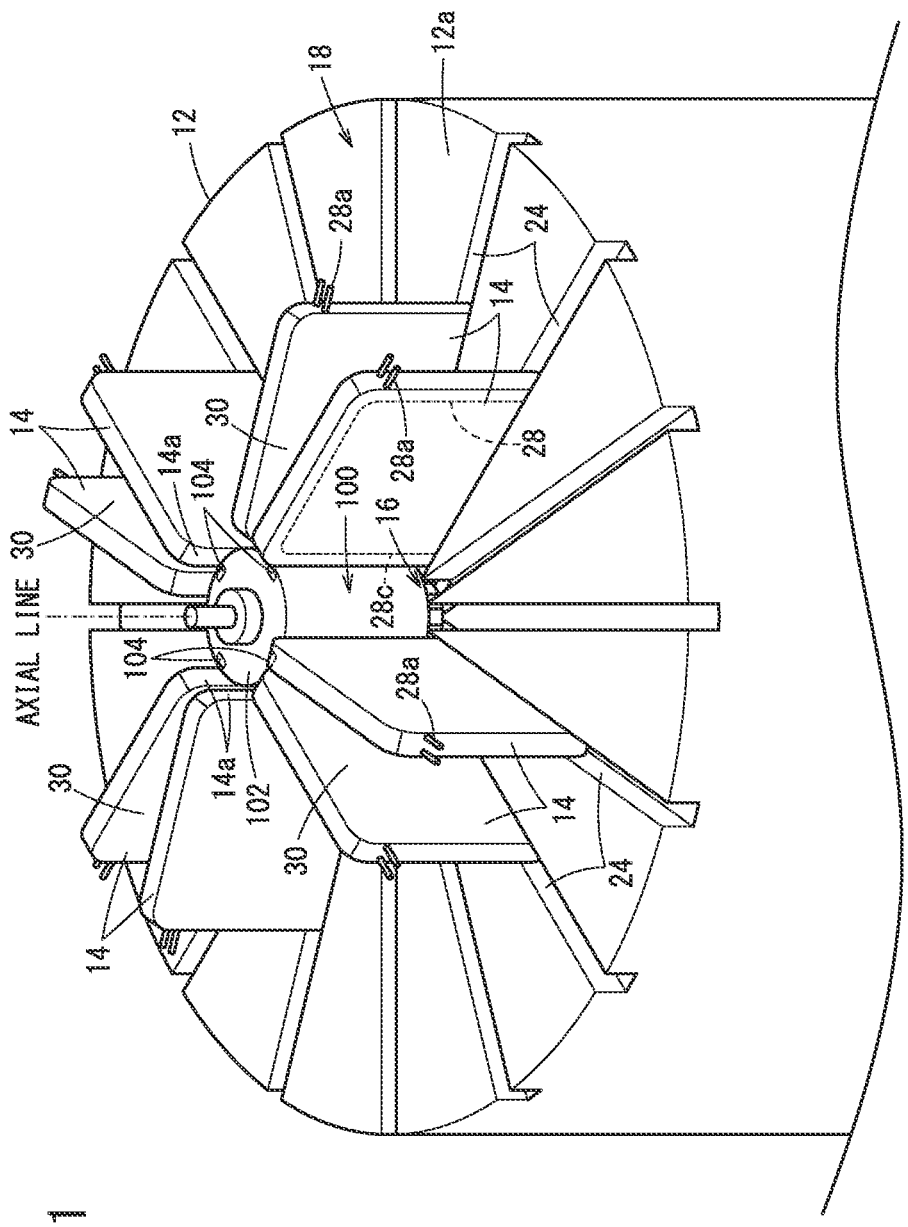
FIG. 1 is a perspective view of a magnetizing apparatus according to an embodiment.

A magnetizing apparatus 10 according to the present embodiment is used for magnetizing a rotor 100. The rotor 100 is used for a PM motor, for example. The rotor 100 has a rotor main body 102 made of a soft magnetic material and a magnetic body 104 to be magnetized. The magnetic body 104 is made of a hard magnetic material and becomes a permanent magnet by being magnetized through the magnetizing method of the present embodiment. The rotor 100 has a cylindrical shape. A plurality of magnetic bodies 104 are arranged at equal intervals in the circumferential direction on the outer peripheral portion of the rotor 100. The number of magnetic bodies 104 arranged in the circumferential direction is the same as the number of poles of the rotor 100. The magnetic bodies 104 are magnetized in the radial direction in a manner so that the outer peripheral side becomes an N pole or an S pole, for example. The rotor 100 is magnetized in a manner so that a magnetic body 104 magnetized to the N pole on the outer peripheral side and a magnetic body 104 magnetized to the S pole on the outer peripheral side alternately appear in the circumferential direction.

The magnetizing apparatus 10 has a holding member 12, a coil member 14, a rotor fixing portion 16, and a coil fixing portion 18. The holding member 12 has a flat mounting surface 12a at the upper end thereof. The holding member 12 has, on the mounting surface 12a, a rotor fixing portion 16 for holding the rotor 100, and a coil fixing portion 18 for holding the coil member 14.

Figure 3:
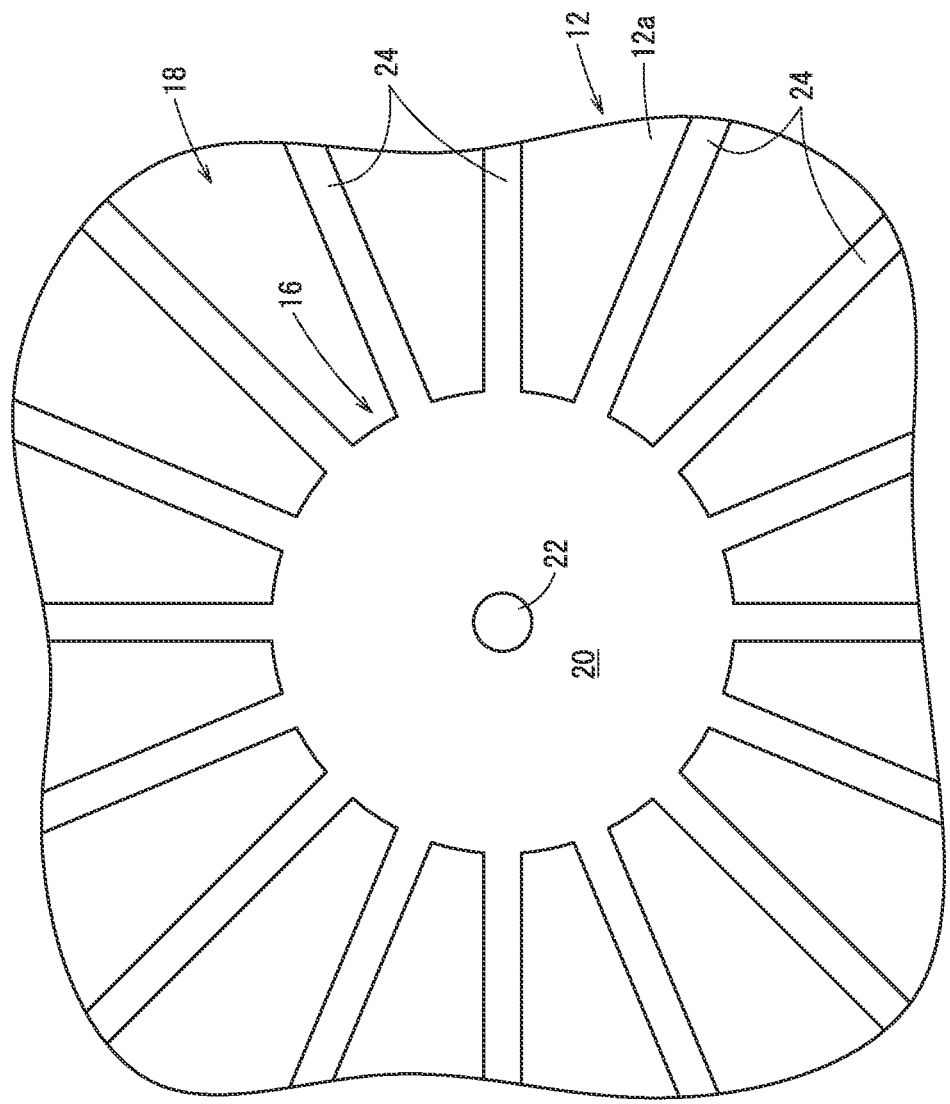
FIG. 3 is a plan view of a holding member of FIG. 1.

As shown in FIG. 3, the rotor fixing portion 16 has a circular concave portion 20 and a fixing pin 22 projecting from a central portion of the concave portion 20. The fixing pin 22 is engaged with an axial portion of the rotor 100 to fix the rotor 100. The concave portion 20 receives rotors 100 of various diameters. The rotor fixing portion 16 may be constituted by, instead of the fixing pin 22 and the concave portion 20, various members such as a clamp mechanism capable of fixing the rotor 100.

The coil fixing portion 18 has a plurality of groove portions 24 extending radially with respect to the center of the rotor fixing portion 16. Each of the groove portions 24 has substantially the same width as the thickness of the coil member 14 described later and can hold and fix the coil member 14. The groove portion 24 extends in the radial direction of the rotor fixing portion 16. The groove portion 24 can freely change the fixing position of the coil member 14 in the radial direction. The number of groove portions 24 is not particularly limited but may be an even number such as 4, 6, . . . , for example. The groove portions 24 are arranged at equal intervals in the circumferential direction.

Figure 2:
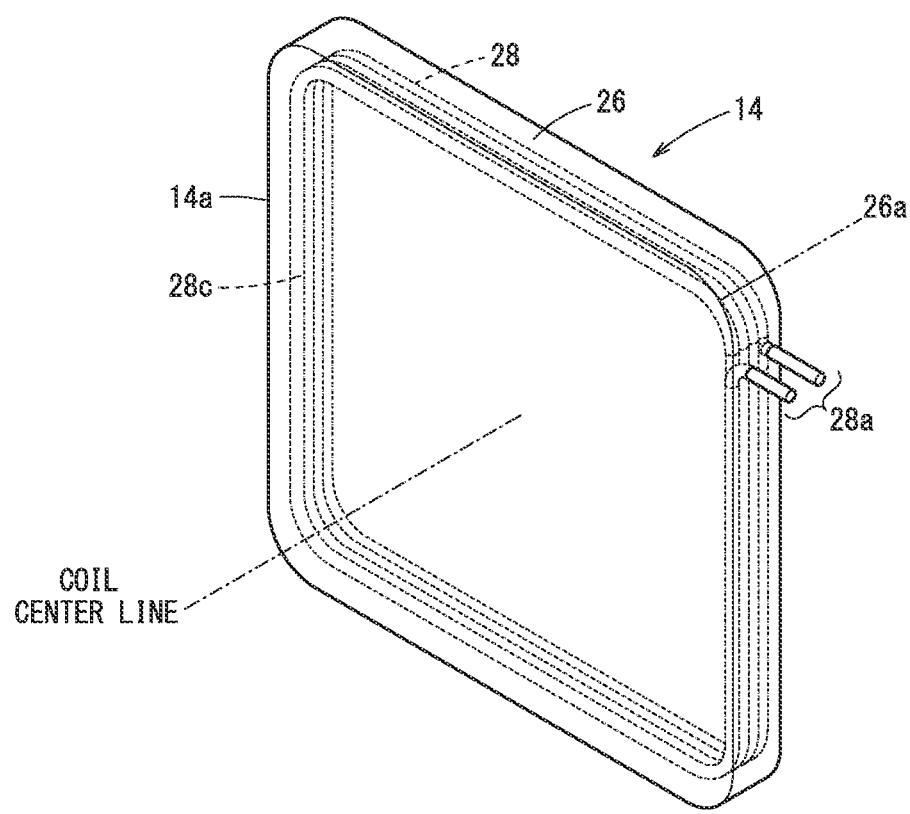
FIG. 2 is a perspective view of a coil member of FIG. 1.

As shown in FIG. 1, the coil member 14 has a substantially rectangular, thin plate shape. As shown in FIG. 2, the coil member 14 includes a support plate 26 and a coil 28. The support plate 26 is a member formed of a non-magnetic material such as resin. The support plate 26 has a substantially rectangular shape on a plane. The coil member 14 has, as one of the side edges of the support plate 26, an inner-side edge portion 14a disposed so as to face the outer peripheral portion of the rotor 100. The inner-side edge portion 14a has a dimension equal to or larger than the axial dimension of the rotor 100.

The coil 28 is embedded and incorporated in the support plate 26. The coil 28 is wound around a coil center line 26a passing through the center of the support plate 26 and extending in the thickness direction.

The coil 28 has a rectangular shape. The coil 28 is wound in a rectangular shape along the outer peripheral portion of the support plate 26. The arrangement pattern of the coil 28 is not limited to the example shown in the drawing and may be a spiral shape or the like. The coil 28 has a straight portion 28c embedded in the vicinity of the inner-side edge portion 14a and extending in parallel with the inner-side edge portion 14a. The straight portion 28c has one or a plurality of wires extending straight. The straight portion 28c is arranged in a direction parallel to the axial direction of the rotor 100. The inner-side edge portion 14a in which the straight portion 28c is embedded is disposed on the outer peripheral side of the magnetic body 104 of the rotor 100 so as to face the rotor 100. The length of the straight portion 28c may be equal to or longer than the axial length of the rotor 100.

When current is applied to such a coil 28, a concentric circular magnetic field is generated at each edge of the coil 28 according to the right-hand rule with respect to the direction of the current. Accordingly, the straight portion 28c of the coil 28 generates a concentric magnetic field at the inner-side edge portion 14a of the coil member 14. In the present embodiment, a concentric magnetic field appearing at the inner-side edge portion 14a is utilized for magnetizing the magnetic body 104. Current is supplied to the coil 28 from terminal portions 28a located at one end and the other end of the coil 28. The terminal portions 28a protrude from the outer-peripheral-side edge of the support plate 26. Wires (not shown) are connected to the terminal portions 28a.

As shown in FIG. 1, the axial dimension of the coil member 14 is larger than the axial dimension of the rotor 100. In this way, it is possible to generate a uniform magnetic field over the axial direction of the rotor 100. Further, the size of the coil member 14 in the radial direction is not particularly limited. The planar shape of the coil member 14 in the radial direction is appropriately set within a range capable of generating a sufficient magnetic field for magnetization. The thickness of the coil member 14 has a dimension capable of being fitted into the groove portion 24.

The number of coil members 14 is equal to or greater than the number of poles (the number of magnetic bodies 104) of the rotor 100. As shown in FIG. 1, two coil members 14 may be used for one magnetic body 104. In the present embodiment, since the magnetic field on the edge of the coil 28 is used, the magnetic field tends to be weaker than the conventional one. When a plurality of coil members 14 are used for one magnetic body 104, it is possible to compensate for the weakness of the magnetic field of a single coil 28.

The magnetizing apparatus 10 can cope with changes in the number of poles of the rotor 100 by increasing or decreasing the number of coil members 14 attached to a plurality of groove portions 24. The coil member 14 is arranged around the rotor 100 in a manner so that the magnetic field at a central portion of the coil member 14 coincides with the circumferential direction of the rotor 100. Wires are connected to adjacent coil members 14 so as to generate magnetic fields in opposite directions. In the example shown in FIG. 1, a pair of coil members 14 are disposed adjacent to the outer peripheral side of one magnetic body 104. A gap 30 between the adjacent coil members 14 substantially coincides with the circumferential position of the magnetic body 104.

The magnetizing apparatus 10 of the present embodiment is configured as described above. The magnetizing method of the present embodiment using the magnetizing apparatus 10 is performed by the following steps.

Figure 4:
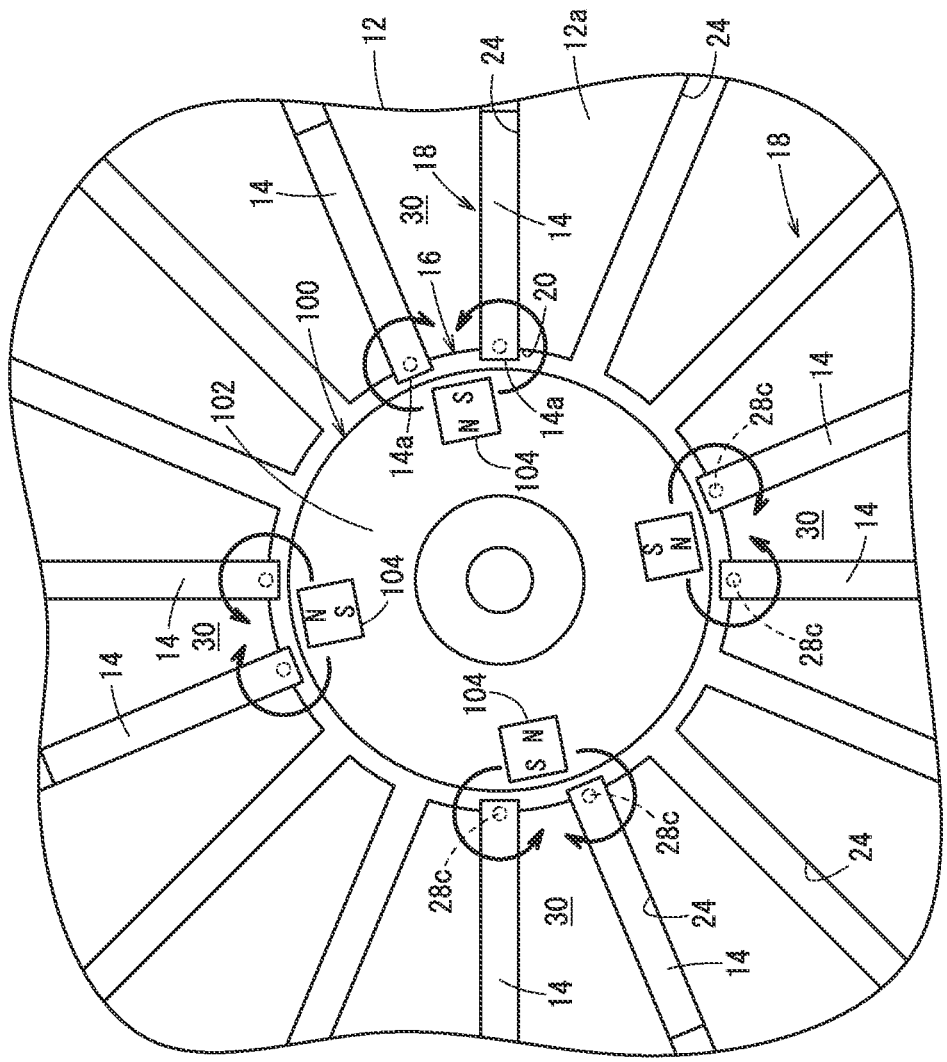
FIG. 4 is a view for explaining the operation of the magnetizing apparatus of FIG. 1.

The magnetizing method of the present embodiment includes a coil arrangement step, a rotor fixing step, and a magnetizing step. The coil arrangement step is a step of arranging a plurality of coil members 14 on the holding member 12. Specifically, the coil arrangement step includes a coil number selection step and a coil fixing step. The coil number selection step is a step of preparing the number of coil members 14 equal to or larger than the number of poles (the number of magnetic bodies 104 in the circumferential direction) of the rotor 100 to be magnetized. For example, when the 8-pole rotor 100 is magnetized, 8 or 16 coil members 14 are prepared as shown in FIG. 4.

Thereafter, the coil member 14 is fixed. The fixing of the coil member 14 is performed by fitting a predetermined number of coil members 14 into the groove portions 24. The coil members 14 are attached to groove portions 24 arranged at equal intervals in the circumferential direction. Further, as shown in FIG. 4, the position of the coil member 14 in the radial direction is adjusted so that the end portion on the inner peripheral side is located in the vicinity of the outer peripheral portion of the rotor 100. Since the groove portion 24 can slide the coil member 14, the positioning of the coil member 14 in the radial direction is facilitated. Thus, the coil arrangement step is completed.

According to the coil arrangement step, the straight portion 28c of the coil 28 is arranged in the vicinity of the magnetic body 104 in a state of being aligned in a direction parallel to the axial direction of the rotor 100. In the coil 28, the straight portion 28c is disposed so as to be a portion closest to the magnetic body 104. Therefore, the direction of the current flowing in the portion of the coil 28 adjacent to the magnetic body 104 is parallel to the axial direction of the rotor 100.

Next, a rotor fixing step is performed. The rotor fixing step is a step of fixing the rotor 100 to the rotor fixing portion 16 at the central portion of the holding member 12 on which the coil members 14 are arranged. In the rotor fixing step, the position of the rotor 100 in the circumferential direction is determined. The rotor 100 is positioned so that the circumferential position of the magnetic body 104 coincides with the circumferential position of the gap 30 of the coil members 14. Thus, two coil members 14 are disposed adjacent to one magnetic body 104.

Thereafter, a magnetization step is performed. In the magnetizing step, current is supplied to the plurality of coil members 14. As shown in FIG. 4, in this embodiment, current is supplied to the coil members 14 so that adjacent coil members 14 generate magnetic fields in opposite directions. When such current is supplied, a concentric magnetic field is generated around the coil 28 of the coil member 14 according to the right-hand rule. By the concentric magnetic fields from two adjacent coil members 14, a radially inward magnetic field or a radially outward magnetic field is applied to the magnetic body 104 adjacent to the inner side of the gap 30. By such magnetic fields, the magnetic body 104 is magnetized radially inward or radially outward. In the magnetizing step, the magnetic bodies 104 are magnetized so that a magnetized magnetic body 104 with the radially outer side being an N pole and a magnetized magnetic body 104 with the radially outer side being an S pole appear alternately in the circumferential direction.

Thereafter, the rotor 100 is removed from the holding member 12 and the magnetizing method for one rotor 100 is completed. Further, the rotor fixing step and the magnetizing step are repeatedly performed until the magnetization of a desired number of rotors 100 is completed.

When the magnetizing apparatus 10 magnetizes the rotors 100 having different diameters and/or different numbers of poles, the number and position of the coil members 14 are adjusted in the coil arrangement step. Therefore, the magnetizing apparatus 10 and the magnetizing method according to the present embodiment can magnetize a plurality of types of rotors 100 and thus can suppress the waste and inefficiency of equipment.

The magnetizing apparatus 10 of the present embodiment can also magnetize the magnetic body 104 in the circumferential direction by adjusting the positional relationship between the coil member 14 and the magnetic body 104. Therefore, by using the magnetizing apparatus 10 and appropriately arranging the coil members 14, a permanent magnet group having a Halbach array can be formed on the rotor 100.

The present embodiment is summarized as follows.

A magnetizing apparatus (10) in one aspect includes a holding member (12) that holds a rotor (100) including a magnetic body (104), a coil member (14) including a support plate (26) that is thin plate-shaped and a coil (28) that is incorporated inside the support plate and wound along the plane of the support plate, and a coil fixing portion (18) that is configured to arrange and fix the coil member around the outer peripheral portion of the rotor so that the direction of electric current at a portion of the coil closest to the magnetic body coincides with the axial direction of the rotor, wherein the coil member generates a concentric magnetic field in accordance with the right-hand rule around the coil and magnetizes the magnetic body with the concentric magnetic field.

The above-described magnetizing apparatus can easily cope with a change in the number of poles of the rotor by adding or removing coil members to or from the coil fixing portion. Further, the magnetizing apparatus can easily adjust the position of the coil member in response to a change in the diameter of the rotor by adjusting the position of the coil member with respect to the coil fixing portion. Therefore, since the magnetizing apparatus can flexibly cope with the rotors having various diameters and various numbers of poles, the waste and inefficiency of equipment can be suppressed.

In the above-described magnetizing apparatus, the coil may have a rectangular shape and include a straight portion 28c extending along the axial direction of the rotor. The magnetizing apparatus can magnetize a magnetic body by using a magnetic field generated around the straight portion. This magnetizing apparatus increases the degree of freedom in the arrangement of coil members and can flexibly cope with rotors having various diameters and numbers of poles.

In the above magnetizing apparatus, the support plate may include an inner-side edge portion 14a arranged to face the rotor, and the straight portion of the coil may be arranged near the inner-side edge portion and in parallel with the inner-side edge portion. The magnetizing apparatus can flexibly cope with various kinds of rotors by arranging the inner-side edge portions of a desired number of support plates so as to face the rotor.

In the above magnetizing apparatus, the coil fixing portion may radially arrange a plurality of support plates. This magnetizing apparatus can efficiently arrange around the rotor a support plate having an inner-side edge portion facing the rotor.

In the above-described magnetizing apparatus, the coil fixing portion may hold the coil member in a manner so that a position of the coil member in the radial direction with respect to the rotor is adjustable. The magnetizing apparatus can easily cope with a change in the diameter of the rotor.

In the above magnetizing apparatus, the coil fixing portion may include a plurality of groove portions 24 that extend radially with respect to the center of the rotor and hold the coil member. This magnetizing apparatus can easily adjust the position of the coil member in the radial direction depending on the diameter of the rotor by sliding the coil member along the groove portion.

In the above-described magnetizing apparatus, the coil member may be fixed to the holding member, having such an orientation that the center line of the coil faces the circumferential direction of the rotor. This magnetizing apparatus can magnetize a magnetic body in the radial direction by a magnetic field generated around the coil member.

In the above magnetizing apparatus, the axial dimension of the straight portion of the coil member may be larger than the axial dimension of the magnetic body of the rotor. The magnetizing apparatus can generate a uniform magnetic field for magnetization in the axial direction.

In the magnetizing apparatus, in number, the coil member arranged may be equal to or more than the magnetic body included in the rotor. The magnetizing apparatus can ensure that a magnetic body is magnetized by magnetic fields generated by a plurality of coil members.

In the above-device, two of the coil members may be arranged at positions adjacent to one of the magnetic bodies in the circumferential direction, and the one magnetic body may be magnetized by the concentric magnetic field of each of the two coil members. The magnetizing apparatus can ensure that a magnetic body is magnetized by applying magnetic fields of two coil members to one magnetic body.

In the above-described magnetizing apparatus, the coil member may be positioned at a position at a boundary portion between a plurality of magnetic bodies that are fixed to the rotor and are to be magnetized. The magnetizing apparatus can magnetize the magnetic body of the rotor in the radial direction.

In the above magnetizing apparatus, the position of the gap 30 between the coil members adjacent in the circumferential direction may coincide with the position of the magnetic body in the circumferential direction. The magnetizing apparatus can magnetize the magnetic body of the rotor in the radial direction.

In the above-described magnetizing apparatus, the coil member equal in number to the magnetic body that is fixed to the rotor and is to be magnetized may be fixed to the coil fixing portion. This magnetizing apparatus is excellent in productivity because all magnetic bodies can be magnetized through a single magnetizing step.

In the above magnetizing apparatus, the coil fixing portion may include a groove portion more in number than the magnetic body. Since the magnetizing apparatus includes an empty groove portion, the magnetizing apparatus can cope with a rotor having a larger number of poles by adding a coil member.

Another aspect is a magnetizing method including a coil arranging step of arranging, around an outer peripheral portion of a rotor including a magnetic body, a coil member including a support plate that is thin plate-shaped and a coil that is incorporated inside the support plate and wound along the plane of the support plate, and a magnetizing step of magnetizing the magnetic body by supplying electric current to the coil member, wherein the coil arranging step includes arranging and fixing the coil member in a manner so that the direction of the electric current at the portion of the coil closest to the magnetic body coincides with the axial direction of the rotor, and the magnetizing step includes generating a concentric magnetic field around the coil according to the right-hand rule and magnetizing the magnetic body with the concentric magnetic field.

Since the magnetizing method described above can flexibly cope with a rotor having various diameters and numbers of poles, the waste and inefficiency of equipment can be suppressed.

In the above-described magnetizing method, the coil may be wound in a rectangular shape and include a straight portion extending in the axial direction of the rotor at a portion of the coil closest to the magnetic body.

In the magnetizing method described above, in the coil arrangement step, the coil member more in number than the magnetic body included in the rotor may be arranged. The magnetizing method can reliably magnetize a magnetic body.

It should be noted that the present invention is not limited to the above-described embodiment, and various configurations can be adopted without departing from the gist of the present invention.

What is claimed is:

1. A magnetizing apparatus comprising:
   a holding member that holds a rotor including a magnetic body;
   a coil member including
      a support plate that is thin plate-shaped, and
      a coil that is incorporated inside the support plate and wound along a plane of the support plate; and
   a coil fixing portion that is configured to arrange and fix the coil member around an outer peripheral portion of the rotor in a manner so that a direction of electric current at a portion of the coil closest to the magnetic body coincides with an axial direction of the rotor, wherein
   the coil member generates a concentric magnetic field in accordance with a right-hand rule around the coil and magnetizes the magnetic body with the concentric magnetic field.

2. The magnetizing apparatus according to claim 1, wherein the coil has a rectangular shape and includes a straight portion extending along the axial direction of the rotor.

3. The magnetizing apparatus according to claim 2, wherein the support plate includes an inner-side edge portion arranged to face the rotor, and the straight portion of the coil is arranged near the inner-side edge portion and in parallel with the inner-side edge portion.

4. The magnetizing apparatus according to claim 2, wherein the coil fixing portion radially arranges a plurality of the support plates.

5. The magnetizing apparatus according to claim 2, wherein an axial dimension of the straight portion of the coil member is larger than an axial dimension of the magnetic body of the rotor.

6. The magnetizing apparatus according to claim 1, wherein the coil fixing portion holds the coil member in a manner so that a position of the coil member in a radial direction with respect to the rotor is adjustable.

7. The magnetizing apparatus according to claim 6, wherein the coil fixing portion includes a plurality of groove portions that extend radially with respect to a center of the rotor and hold the coil member.

8. The magnetizing apparatus according to claim 1, wherein in number, the coil member arranged is equal to or more than the magnetic body included in the rotor.

9. The magnetizing apparatus according to claim 8, wherein two of the coil members are arranged at positions adjacent to one of the magnetic bodies in a circumferential direction, and the one of the magnetic bodies is magnetized by the concentric magnetic field of each of the two coil members.

10. The magnetizing apparatus according to claim 8, wherein the coil fixing portion includes a groove portion more in number than the magnetic body.

11. A magnetizing method comprising:
   arranging, around an outer peripheral portion of a rotor including a magnetic body, a coil member including a support plate that is thin plate-shaped and a coil that is incorporated inside the support plate and wound along a plane of the support plate; and
   magnetizing the magnetic body by supplying electric current to the coil member,
   wherein
   the arranging includes arranging and fixing the coil member in a manner so that a direction of the electric current at a portion of the coil closest to the magnetic body coincides with an axial direction of the rotor, and
   the magnetizing includes generating a concentric magnetic field around the coil in accordance with a right-hand rule and magnetizing the magnetic body with the concentric magnetic field.

12. The magnetizing method according to claim 11, wherein the coil is wound in a rectangular shape and includes a straight portion extending in the axial direction of the rotor at a portion of the coil closest to the magnetic body.

13. The magnetizing method according to claim 11, wherein in the arranging, the coil member more in number than the magnetic body included in the rotor is arranged.

* * * * *